(12) United States Patent
Luschi et al.

(10) Patent No.: US 9,191,059 B2
(45) Date of Patent: Nov. 17, 2015

(54) PROCESSING DIGITAL SAMPLES IN A WIRELESS RECEIVER

(75) Inventors: Carlo Luschi, Oxford (GB); Gang Wang, Bristol (GB)

(73) Assignee: ICERA INC., Wilmington, DE (US)

( * ) Notice: Subject to any disclaimer, the term of this patent is extended or adjusted under 35 U.S.C. 154(b) by 714 days.

(21) Appl. No.: 12/794,211

(22) Filed: Jun. 4, 2010

(65) Prior Publication Data

US 2010/0296553 A1 Nov. 25, 2010

Related U.S. Application Data (63) Continuation-in-part of application No. 12/016,652, filed on Jan. 18, 2008.

(30) Foreign Application Priority Data

Oct. 31, 2007 (GB) .................................. 0721425.7
Jan. 28, 2010 (GB) .................................. 1001389.4

(51) Int. Cl.
*H03K 9/00* (2006.01)
*H04B 1/707* (2011.01)
(Continued)

(52) U.S. Cl.
CPC .............. *H04B 1/707* (2013.01); *H04B 1/7117* (2013.01); *H04B 2201/7071* (2013.01); *H04L 25/0212* (2013.01); *H04L 25/03012* (2013.01)

(58) Field of Classification Search
USPC .......................................................... 375/316
See application file for complete search history.

(56) References Cited

U.S. PATENT DOCUMENTS 6,252,915 B1 * 6/2001 Mollenkopf et al. ......... 375/297
6,333,953 B1 12/2001 Bottomley et al.
(Continued)

FOREIGN PATENT DOCUMENTS

EP 1359674 A1 5/2003
EP 2012439 A2 1/2009
(Continued)

OTHER PUBLICATIONS

Klein, A., Data detection algorithms specially designed for the downlink of CDMA mobile radio systems, IEEE Vehicular Technology Conference, Vo. 1, May 1997, pp. 203-207.
(Continued)

*Primary Examiner* — Santiago Garcia (57) ABSTRACT

A method of processing digital samples of a signal received at a receiver of a wireless communication system includes monitoring channel conditions and generating a channel indicator including at least one channel parameter by performing at least one of: estimating a channel mobility parameter and comparing it with a threshold; estimating a channel parameter of the energy of the channel outside a predefined temporal window and comparing it with a threshold; estimating a channel temporal duration parameter and establishing if it meets predetermined criteria; estimating a channel-zero location parameter and establishing if it meets predetermined criteria; estimating a received-signal signal-to-disturbance power ratio and comparing it to a threshold; estimating an estimated-channel-response signal-to-disturbance power ratio; estimating the degree of non-stationarity of the disturbance at the receiver input; and selecting one of a plurality of processing routines for processing the digital samples based on said channel indicator. Related receivers are also described.

12 Claims, 8 Drawing Sheets

(51) Int. Cl.
*H04B 1/7117* (2011.01)
*H04L 25/03* (2006.01)
*H04L 25/02* (2006.01)

(56) References Cited

U.S. PATENT DOCUMENTS

| | | | |
|---|---|---|---|
| 6,901,243 B2 * | 5/2005 | Jayaraman et al. | 455/63.1 |
| 7,020,073 B2 | 3/2006 | Kadous et al. | |
| 7,224,714 B1 * | 5/2007 | Barman et al. | 375/140 |
| 7,397,844 B2 * | 7/2008 | Smee et al. | 375/148 |
| 7,646,802 B2 * | 1/2010 | Black et al. | 375/147 |
| 7,746,970 B2 | 6/2010 | Mergen et al. | |
| 7,796,680 B2 | 9/2010 | Matsumoto et al. | |
| 8,189,653 B2 * | 5/2012 | Luschi et al. | 375/232 |
| 2003/0087622 A1 | 5/2003 | Jayaraman et al. | |
| 2003/0095508 A1 | 5/2003 | Kadous et al. | |
| 2004/0165650 A1 * | 8/2004 | Miyazaki et al. | 375/141 |
| 2006/0120438 A1 | 6/2006 | Reial | |
| 2007/0054692 A1 * | 3/2007 | Nie et al. | 455/522 |
| 2007/0076791 A1 | 4/2007 | DiFazio et al. | |
| 2007/0110201 A1 * | 5/2007 | Mergen et al. | 375/350 |
| 2008/0016381 A1 * | 1/2008 | Fitton et al. | 713/320 |
| 2008/0075147 A1 * | 3/2008 | Grossman et al. | 375/136 |
| 2008/0159373 A1 * | 7/2008 | Taha et al. | 375/232 |
| 2009/0110036 A1 | 4/2009 | Luschi et al. | |
| 2009/0110048 A1 * | 4/2009 | Luschi et al. | 375/232 |
| 2009/0110049 A1 * | 4/2009 | Luschi et al. | 375/233 |
| 2009/0111413 A1 * | 4/2009 | Luschi et al. | 455/230 |
| 2009/0124204 A1 | 5/2009 | Howard et al. | |
| 2009/0268786 A1 * | 10/2009 | Matsumoto et al. | 375/148 |
| 2009/0274196 A1 * | 11/2009 | Black et al. | 375/147 |
| 2011/0019754 A1 * | 1/2011 | Andrews et al. | 375/260 |
| 2011/0032837 A1 * | 2/2011 | Luschi et al. | 370/252 |
| 2011/0058597 A1 * | 3/2011 | Huckett et al. | 375/232 |
| 2011/0200075 A1 * | 8/2011 | Clevorn et al. | 375/148 |
| 2012/0087406 A1 * | 4/2012 | Lim et al. | 375/232 |
| 2013/0051448 A1 | 2/2013 | Luschi et al. | |

FOREIGN PATENT DOCUMENTS

| | | |
|---|---|---|
| WO | 9904537 A1 | 1/1999 |
| WO | 0223742 A2 | 3/2001 |
| WO | 2007107805 A1 | 9/2007 |
| WO | 2009056500 A2 | 5/2009 |
| WO | 2011092249 A1 | 8/2011 |

OTHER PUBLICATIONS

Hooli, K, et al., Performance evaluation of adaptive chip-level channel equalizers in wcdma downlink, IEEE pp. 1974-1979.
Dumais, Philippe et al.; "On the Implementation of a Multi-Equalizer"; IEEE; 2005; 4 pages; Montreal, Canada.
Ieric Hardouin et al.; "Environment-Adaptive Receivers: A Performance Predicition Approach"; IEEE ICC; 2006; pp. 5709-5714; cedix 9, France.
Examiner's Report; Jun. 28, 2012; 5 pages; European Patent Office, Berlin, Germany.
Abou-Khousa, Mohamed, et al., "On Multipath Detection in CDMA Systems," IEEE, 2005, 5 pages.
Proakis, John G., "Digital Communications," Second Edition, Department of Electrical and Computer Engineering, 1989, 10 pages.
GB application No. 0721425.7, entitled "Processing Digital Samples in a Wireless Receiver," filed Oct. 31, 2007, 34 pages.
GB application No. 1001389.4, entitled "A Radio Receiver in a Wireless Communication System," filed Jan. 28, 2010, 23 pages.

* cited by examiner

PROCESSING DIGITAL SAMPLES IN A WIRELESS RECEIVER

CROSS REFERENCE TO RELATED APPLICATION

This application is a continuation-in-part of U.S. application Ser. No. 12/016,652 filed on Jan. 18, 2008; entitled "Processing Digital Samples in a Wireless Receiver" which claims priority from GB 0721425.7 filed on Oct. 31, 2007. This application also claims priority from GB 1001389.4 filed on Jan. 28, 2010. The above filed applications are commonly assigned with the present invention and incorporated herein by reference in their entirety.

TECHNICAL FIELD

The present invention relates to a radio receiver in a wireless communications system, and to a method of processing radio signals.

BACKGROUND

The transmission of radio signals in modern wireless communications can be realized based on a number of different communications systems, often specified by a standard. There are increasing requirements for devices which are able to operate to support more than one of these wireless communications systems. Mobile radio receiver devices include analog radio frequency (RF)/intermediate frequency (IF) stages, which are arranged to receive and transmit wireless signals via one or more antennas. The output of the RF/IF stages is typically converted to baseband, where an Analog-to-Digital Converter (ADC) converts incoming analog signals to digital samples, which are then processed for signal detection and decoding of the information data. The ADC may alternatively operate directly at IF, in which case the conversion to baseband is performed in the digital domain. A number of different types of front end processing of the digital samples are known to implement signal detection, including rake receiver processing and channel equalisation processing.

In Code-Division Multiple Access (CDMA) wireless systems, different physical channels are multiplexed in the code domain using separate spreading sequences. In the case of orthogonal spreading codewords, the original data symbols can then be effectively separated at the receiver by despreading.

In a Wideband CDMA (WCDMA) cellular system, downlink code multiplexing is performed using Orthogonal Variable Spreading Factor (OVSF) codes. However, the OVSF codewords are orthogonal to each other only under the condition of perfect time alignment. In the presence of multipath propagation, the code orthogonality is lost, and the operation of despreading is affected by Multiple Access Interference (MAI).

CDMA mobile radio receivers conventionally employ a rake processor which relies on the correlation properties of the spreading sequences. A rake processor is described for example in J. G. Proakis, "Digital Communications", New York: McGraw-Hill, 1995. This type of receiver is subject to performance degradation in the presence of code correlation, if the MAI between code-multiplexed transmission is comparable to the other sources of noise and interference. Under these conditions, a performance advantage may be achieved by attempting to restore the orthogonality between the codes before despreading. The sub-optimality of conventional 3GPP receivers based on rake processing causes a significant performance penalty, especially for downlink data rates increasing from the 384 kbps for WCDMA Release 99 to High Speed Downlink Packet Access (HDSPA) rates of several Mbps. When the code orthogonality is destroyed by multipath, an effective approach is to use channel equalisation instead of rake processing.

Channel equalisation techniques have been widely employed over the last decades for combating intersymbol interference on frequency selective transmission channels. Channel equalisation techniques are described in J. G. Proakis, "Digital Communications", New York: McGraw-Hill, 1995, and S. Benedetto, E. Biglieri, and V. Castellani, "Digital Transmission Theory", Englewood Cliffs, N.J.: Prentice-Hall, 1987. Channel equalisers have recently found application in receivers for Time Division Multiple Access (TDMA) and code division multiple access (CDMA) mobile wireless systems. An example of application of channel equalisation to a CDMA cellular system is described in A. Klein "Data Detection Algorithms Specially Designed for the Downlink of CDMA Mobile Radio Systems", IEEE Vehicular Technology Conference, vol. 1, Phoenix Ariz., May 1997, pp. 203-207. In particular in asynchronous CDMA cellular systems, as in the case of the forward link of the 3GPP WCDMA standard, chip level equalisation allows to significantly improve the performance over conventional rake receivers, at the cost of an increased implementation complexity. This advantage is especially important for high rate data transmission, as in 3GPP high speed downlink packet access (HDDPA).

However, channel equalization may not be able to provide superior performance in all possible scenarios. In particular, the use of a channel equaliser does not provide an advantage under single-ray propagation conditions, i.e., in the absence of multipath propagation.

The above limitations generally depend on the particular equalization algorithm under consideration. In the case of a linear MMSE equaliser, in the presence of a non-frequency selective or flat channel response, the equaliser processing still relies on the estimation of the channel impulse response, with a channel estimation error proportional to the number of the channel impulse response samples. In this situation, the use of a rake receiver not only does not correspond to a performance loss caused by MAI, but in fact reduces to a minimum the channel estimation error, relying on the estimate of a single channel tap.

Similarly, in the case of a Least-Squares (LS) equaliser, the receiver performance may be penalized by using the estimation of the channel statistics performed with a dimensionality higher than required in the specific conditions of non dispersive channel, i.e., of channel propagation profile with a single tap.

It is an aim of the present invention to optimise the processing facilities of a receiver in a wireless communication environment, in particular taking into account required signal processing performance set against the computing resources and/or power consumption required to obtain that processing performance.

It is another aim of this invention to identify n-ray propagation conditions, which is capable of resolving the above issue.

SUMMARY

One aspect provides a method. In one embodiment, the method processes radio signals in a wireless radio receiver to identify an n-ray channel condition comprising:

receiving signal samples and estimating a plurality of channel taps from the samples;

estimating for each of the channel taps a signal power and a disturbance power;

filtering the signal power to provide a filtered signal power quantity;

filtering the disturbance power to provide a filtered disturbance power quantity;

using the filtered power quantities to determine n strongest channel taps;

generating first and second comparison parameters using the n strongest channel taps and at least one other channel tap;

providing a comparison result based on the first and second comparison parameters and a threshold value; and identifying an n-ray channel condition from the comparison result.

Another aspect of the invention provides a radio receiver. In one embodiment, the radio receiver is a radio receiver for a wireless communication system comprising:

means for receiving signal samples and estimating a plurality of channel taps from the samples;

means for estimating for each of the channel taps a signal power and a disturbance power;

means for filtering the signal power to provide a filtered signal power quantity;

means for filtering the disturbance power to provide a filter disturbance power quantity;

means for using the filtered power quantities to determine n strongest channel taps;

means for generating first and second comparison parameters using the n strongest channel taps and at least one other channel tap;

means for providing a comparison result based on the first and second comparison parameters and a threshold value; and means for identifying an n-ray channel condition from the comparison result.

A further aspect of the invention provides a computer program product. In one embodiment, the computer program product implements the method defined above when executed on a processor.

A further aspect of the invention provides a radio receiver. In one embodiment, the radio receiver is a radio receiver for a wireless communication system comprising:

a wireless interface for receiving digital samples;

a processor arranged to execute a program which implements the steps of the above defined method; and a memory holding a rake processing code sequence and an equalisation processing code sequence; the processor adapted to execute one of the rake processing and equalisation processing sequence in dependence on the identified n-ray channel condition.

The following described embodiments relate to the implementation of an algorithm where n=1 for the identification of single ray channel conditions in a wireless receiver, based on the estimation of the received signal power and noise plus interference power. The method and receiver are particularly useful when applied to the selection of appropriate receiver parameters and signal processing algorithms in a 3GPP wideband code division multiple access (WCDMA)/high speed downlink packet access (HSDPA) receiver. In that case, the invention is particularly beneficial when applied to the selection between rake receiver processing and equalisation processing in a receiver.

The invention is generally applicable to any communication system where there is a need to detect transmission conditions over a non-frequency selective channel. The invention is particularly but not exclusively concerned with the identification of single ray propagation conditions in a high speed wireless receiver.

It will be understood that disturbance power refers to noise (such as additive Gaussian White Noise) and interference (such as from other signals).

According to another aspect of the present invention there is provided a method. In one embodiment, the method processes digital samples of a signal received at a receiver via a channel in a wireless communication system, the method comprising monitoring channel conditions and generating a channel indicator comprising at least one channel parameter by:

estimating a channel parameter indicative of at least one of the temporal duration of the channel response and channel length and channel delay distribution, and establishing if the estimated temporal duration or channel length or delay distribution meets predetermined criteria; and selecting one of a plurality of processing routines for processing the digital samples based on said channel indicator.

It will be appreciated the invention can be used in the context of estimating additional parameters as described in parent application U.S. application Ser. No. 12/016,652.

Estimated parameters can be compared with more than one threshold to allow "bands" to be defined. For example, in the case of a Doppler estimate, low speed, medium speed, high speed.

The method is particularly useful when there is a processor for implementing the processing routines. The processor in that case can also be arranged to execute a selecting routine to which the channel indicator is supplied. The selecting routine executed by the processor then carries out the selecting step. In this way, an automatic selection of appropriate processing routines can be accomplished suitable for the prevailing channel conditions.

The processing routines can include processing functions for receiving the digital samples and generating reliability values for data decoding. These functions can include a rake receiver function and an equalisation function.

There can be a plurality of equalisation functions, each implemented by a different equalisation algorithm. Moreover, the equalisation functions can be implementable using different equalisation parameters, the parameters being selectable thereby to select one of the processing routines.

Another aspect provides a receiver. In one embodiment, the receiver is a receiver for processing digital samples transmitted in a wireless communications system, the receiver comprising:

Means for monitoring channel conditions and for generating a channel indicator comprising at least one channel parameter by estimating a channel parameter indicative of at least one of the temporal duration of the channel response and channel length and channel delay distribution, and establishing if the estimated temporal duration or channel length or delay distribution meets predetermined criteria; and a processor for processing the digital samples in accordance with one of a plurality of processing routines, said processor arranged to implement a selecting routine for selecting said one of a plurality of processing routines.

Another aspect provides a computer program. In one embodiment, the computer program product comprises program code means which, when executed by a processor, carry out the steps of the method.

Another aspect provides a mobile terminal. In one embodiment, the mobile terminal is a mobile terminal having a wireless interface for receiving a signal and providing digital samples to a receiver as defined hereinabove.

The inventors have realised that the extent to which an optimised trade-off between superior performance and use of available processing resources and/or power consumption can be attained is dependent on certain channel conditions.

In this context, the word channel is used to denote the communication path of the radio signals. According to the communication system used, channels can be defined by time, code or frequency as is well known in the art. The quality of particular channels is affected by conditions related to the propagation environment, the cellular layout and other conditions in the wireless communications system.

For a better understanding of the present invention and to show how the same may be carried into effect, reference will now be made by way of example to the accompanying drawings.

BRIEF DESCRIPTION

Reference is now made to the following descriptions taken in conjunction with the accompanying drawings, in which.

DETAILED DESCRIPTION

Figure 1:
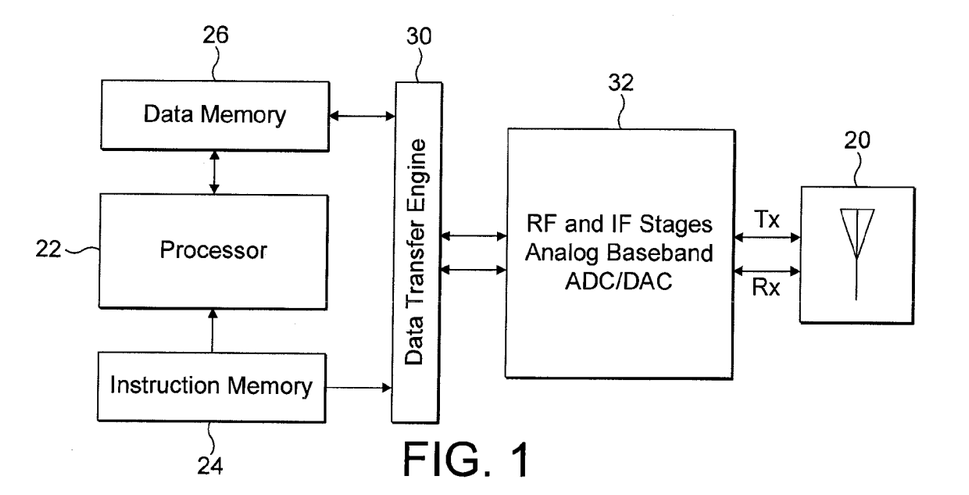
FIG. 1 is a schematic block diagram of a wireless communications device.

Those skilled in the art to which this application relates will appreciate that other and further additions, deletions, substitutions and modifications may be made to the described embodiments. FIG. 1 is a schematic block diagram of a device for transmitting and receiving signals in a wireless communications system. Such a device can be implemented in a number of different ways, but in accordance with FIG. 1 a series of RF/IF stages 32 is arranged to receive and transmit wireless signals (TX, RX) via one or more antennas 20. The embodiments of the present invention discussed herein are principally concerned with receiving wireless signals, and so that transmit signals will not be mentioned further. The received signal at the output of the RF/IF stages is typically converted to baseband, where an ADC converts the analog signal into digital samples. The block 32 of FIG. 1 includes components for processing the received radio signals and providing digital signal samples r(k). This can be achieved in different ways, which are known in the art and which are not discussed further herein.

The samples r(k) are supplied to a Data Transfer Engine 30 which communicates with a processor 22, an instruction memory 24 and a data memory 26. The processor 22 is responsible for processing the samples r(k). The processor 22 can execute a number of different functions which are held in an instruction memory 24 in the form of code sequences. This provides a so-called soft modem which has a number of advantages discussed further herein.

Figure 2:
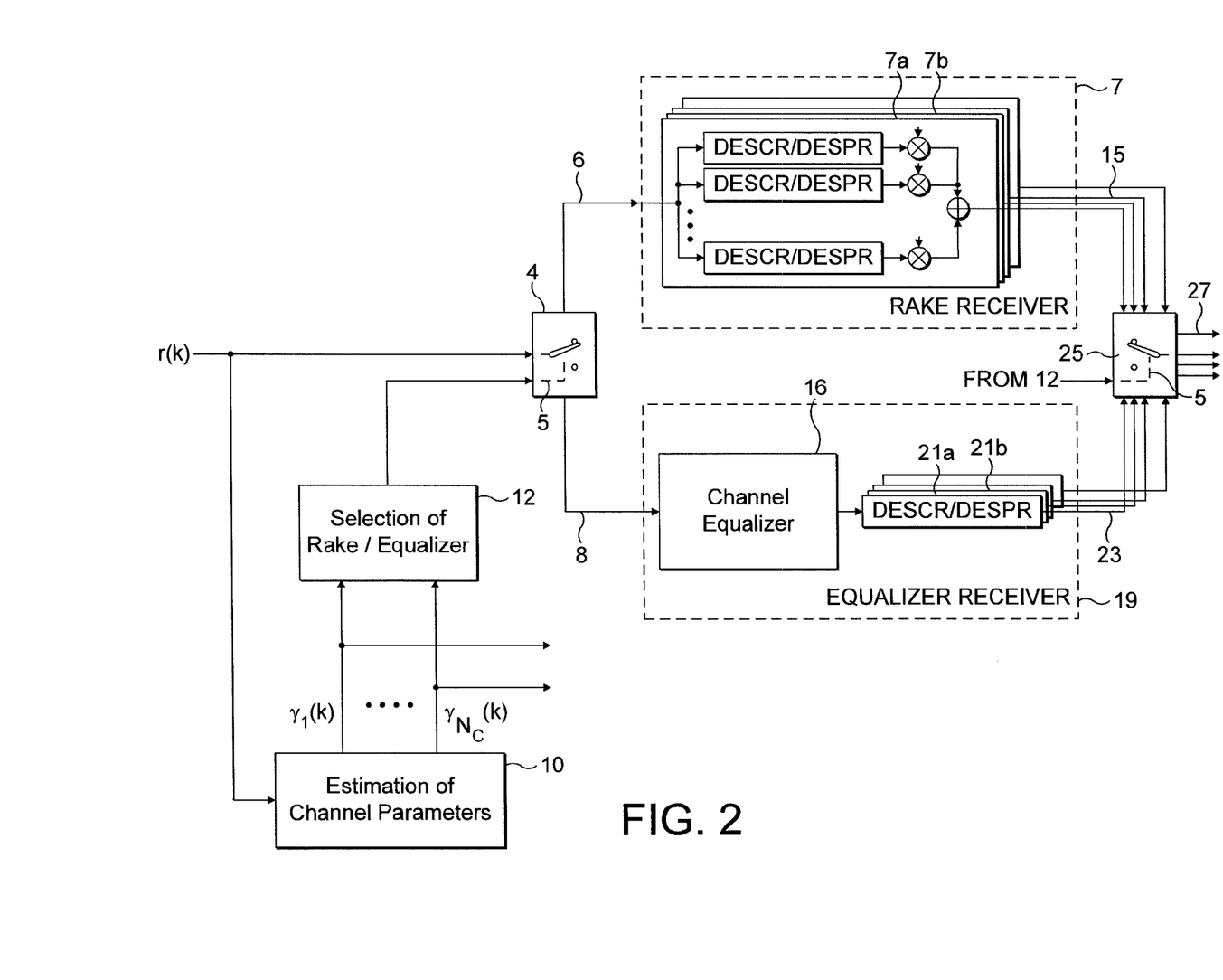
FIG. 2 is a block diagram showing selection between a rake receiver processing and an equaliser processing.
Figure 3:
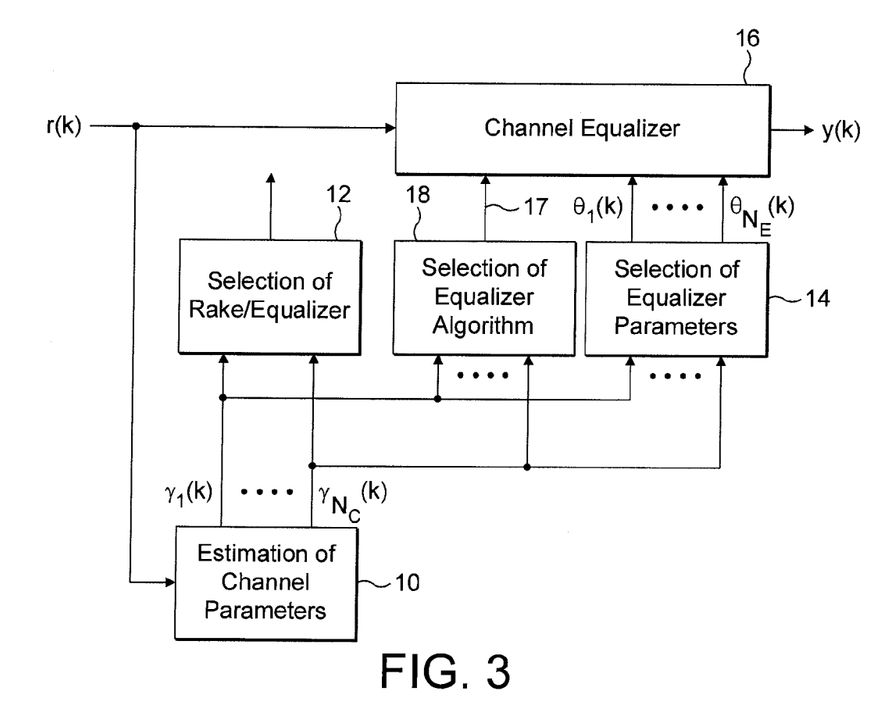
FIG. 3 is a schematic block diagram of processing functions.

FIG. 2 and FIG. 3 are schematic block diagrams which illustrate some among a number of different functions that are executed by the processor 22. A first function denoted by block 10 is referred to as estimation of channel parameters. This function estimates a number of different parameters related to the communication channels over which the radio signals are transmitted in the wireless communication system. The function 10 provides at time k the outputs $\gamma_n(k)$, n=1, . . . , $N_C$, where $N_C$ denotes the number of estimated channel parameters, that represent a set of channel parameters derived from the received signal samples r(k). The estimated channel parameters $\gamma_n(k)$ can be used for a number of different purposes. As illustrated in FIG. 2 and FIG. 3, they are supplied to a Selection of Rake/Equaliser Receiver function 12 which determines whether to process the received samples using a rake receiver or an equaliser receiver. The rake receiver or equaliser receiver is implemented by the processor 22 executing the appropriate code sequence from the instruction memory 24.

The parameters $\gamma_n(k)$ are further supplied to a Selection of Equaliser Algorithm function 18 which is used in the event that an equaliser receiver 16 is selected. If used, the function 18 selects a particular algorithm for implementing the equaliser receiver 16 based on the channel parameters which have been estimated. The algorithm is supplied to the channel equaliser as denoted diagrammatically by input 17. In practice of course this will be implemented by the appropriate algorithm being selected as a code sequence from the instruction memory.

The channel parameters $\gamma_n(k)$ are also supplied to a Selection of Equaliser Parameters function 14. The equaliser parameter selection function 14 is used in the event that an equaliser receiver is selected (as denoted by block 16) and controls parameters used for implementing the equaliser receiver, these parameters being denoted $\theta_n(k)$, n=1, . . . , $N_E$, where $N_E$ denotes the number of relevant equaliser parameters.

The use of the estimated channel parameters to control the selection of a rake receiver or equaliser receiver (function 12) will now be discussed in more detail. FIG. 2 illustrates the concept in schematic form. The digital samples r(k) are supplied to a switch 4 which has an input 5 receiving the command signal for the selection of rake receiver or equaliser processing from the function 12. In accordance with this signal, the switch 4 selects a processing path 6 via a rake receiver 7, or a processing path 8 via an equaliser 9. As is known in the art, the rake receiver includes a set of rake fingers 7a, 7b, . . . , for each channel transmitted on a separate channelization code. Each finger is associated with a single descramblers/despreader 9 and a weighting function 11, and the set of fingers relative to each channel are associated to an adder 13 providing a processed output on output path 15. As the operation of a rake receiver is well understood to a person skilled in the art, its function will not further be described here.

The equaliser receiver 19 comprises a chip level equaliser 16 and a plurality of descramblers/despreaders 21a, 21b, . . . for each channel transmitted on a separate channelization code. The outputs of the descramblers/despreaders are supplied along output path 23. An output switch 25 provides processed outputs on lines 27 to subsequent decoding functions. The switch 25 is (like the switch 4) controlled by control input 5 which receives the command signal for the selection of rake receiver or equaliser from the function 12.

While FIG. 2 illustrates the concept of processing function selection, it will readily be appreciated that in the embodiment of the invention illustrated in FIG. 1, it is not possible to identify different physical paths (6, 8, 15, 23). Instead, selection is made by downloading different code sequences dependent on whether a rake receiver function or equaliser receiver function is to be executed by the processor 22.

In such a software implementation of the receiver, where only either rake or equaliser processing is performed at any given time, the above approach also provides an overall reduction of computational complexity with respect to a conventional receiver implementing a channel equaliser in hardware. In this respect conventional modems based on a hardware implementation are forced to the choice between a design dictated by the maximum date rate requirements and the instantiation of multiple algorithms as separate areas of silicon. These solutions imply higher implementation costs, size and/or power consumption and any compromise would inevitably penalise performance. On the other hand, the proposed solution allows to reduce complexity, size and cost by reusing a common platform to adaptively select the optimum set of signal processing functions capable of maximising performance and minimise power consumption.

Figure 4:
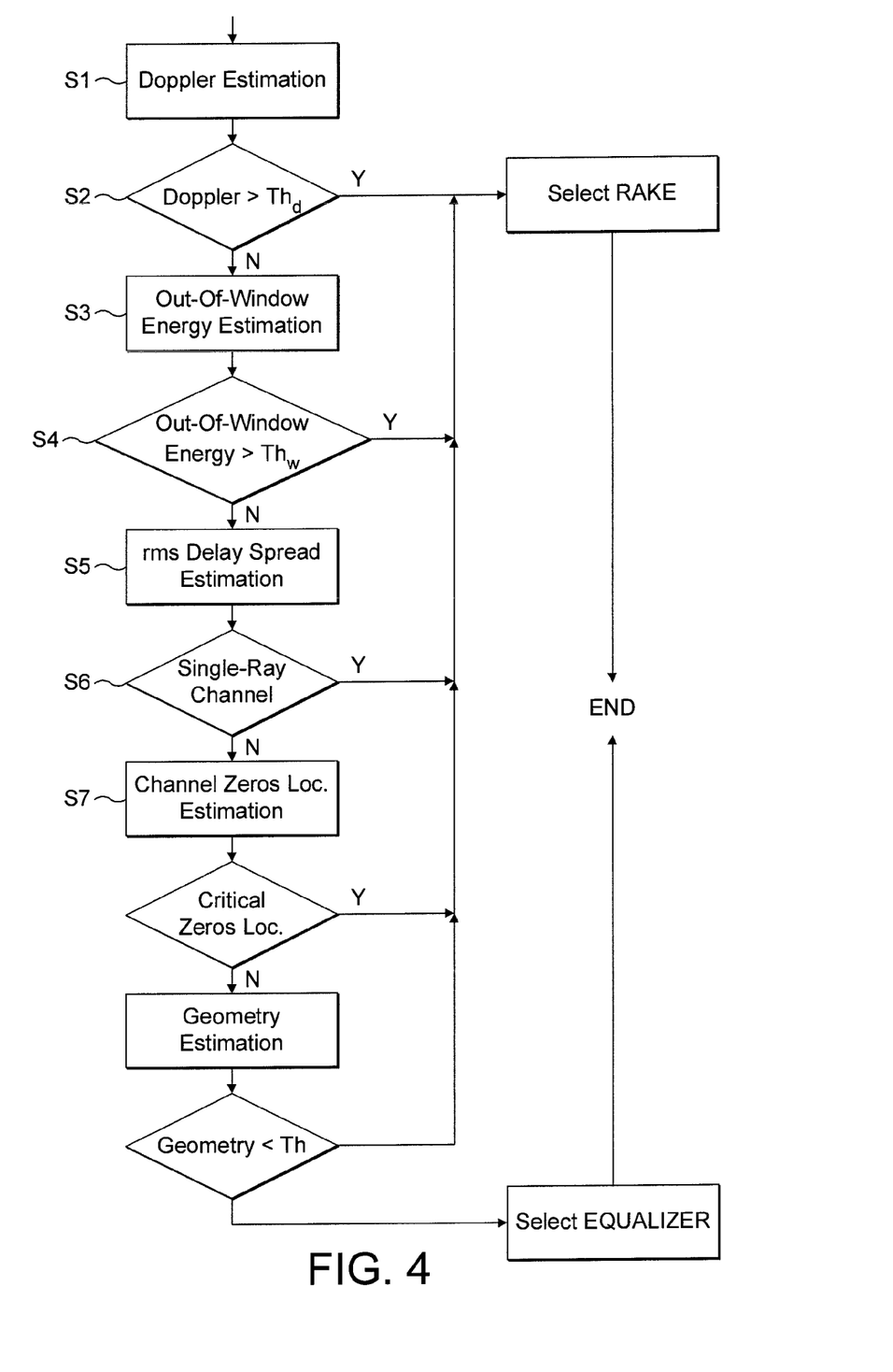
FIG. 4 is a schematic diagram of a sequence of steps for selecting a processing function.

Reference will now be made to FIG. 4 to describe a method of selecting a processing function based on the estimation of particular channel parameters. The inventors have found that it is advantageous to apply the selection criteria by examining different channel parameters in a certain sequence (as illustrated in FIG. 4 and described below). It will readily be appreciated however that other appropriate sequences may also be utilised.

Step S1 produces an estimate of the degree of non-stationarity of the transmission channel, e.g. an estimate of the channel Doppler spread. This is known in the art and so the manner in which it is estimated is not discussed further herein. The receiver can be designed to use equaliser processing for relatively low time-varying channels, and to switch to rake processing for fast time-varying channels, where the switching threshold should depend on the desired trade-off between equaliser complexity and receiver performance. A Doppler Comparison step S2 compares a Doppler estimation signal $\gamma_1$ with a suitable threshold $Th_D$. If $\gamma_1$ exceeds the threshold $Th_D$, the step selects rake receiver processing. If the Doppler estimation signal $\gamma_1$ does not exceed the threshold $Th_D$, the comparison produces a negative answer, and the selection process continues with an Out-Of-Window Energy Comparison step.

The out-of-window energy estimation S3 provides an estimate of the channel energy outside the time window used for equaliser channel estimation. Equaliser processing is selected only when a significant percentage of the channel energy is captured by the channel estimation window—which will not happen in the case of very high delay spread). To this end, the out-of-window energy $\gamma_2$ is compared with a threshold $Th_W$. If $\gamma_2$ is greater than the threshold $Th_W$, the step selects rake receiver processing. If the out-of-window energy $\gamma_2$ is not greater than $Th_W$, the selection process continues with a Single-Ray Channel Detection step.

Step S5 produces an estimate of the temporal duration of the channel response, or channel length or channel delay distribution, e.g. through an estimate of the channel root-mean square (rms) delay spread. A channel length or channel delay distribution estimation S5, implementing e.g. an rms delay spread estimation, generates an output $y_3$ which is supplied to the Single-Ray Channel Detection step S6 to determine if the transmission channel can be considered to result from a single propagation path (multipath absent). In case of single-path propagation, the step selects rake receiver processing.

More generally identification of the conditions of very long channel impulse response (high delay spread) and single-ray channel impulse response (zero delay spread) can be used to switch the receiver to rake receiver processing.

An alternative technique for detecting a single ray condition for switching to rake receiver is described below with reference to FIG. 9.

In the event of non single-ray channel, the process passes to an estimate of channel characteristics from the location of the channel zeros in the z-plane (S7). The receiver may be designed to switch to rake processing in the presence of locations of the zeros that identify channel characteristics that are critical for the operation of the equaliser—as in the case of Baud-spaced linear equalisation with channel zeros close to the unit circle of the z-plane, or for fractionally-spaced equalisation or, more generally receive diversity equalisation (multiple receive antennas or multiple subchannels obtained by oversampling) with common zeros among the equaliser subchannels. The estimate of the channel zeros location $\gamma_4$ is supplied to a Critical Zeros Location Detection step S8, which selects rake receiver processing in the presence of locations of zeros which would be critical for operation of an equaliser. In case of non-critical channel characteristics, the selection process continues with a Cell Geometry Comparison step.

A cell geometry estimation block provides an estimate of the ratio between received intracell power and noise-plus-intercell interference power (or its inverse), or an estimate of the ratio between total received power and noise-plus-intercell interference power (or its inverse), or, more in general, an estimate of the signal-to-disturbance ratio at the detector input (or its inverse). This estimate $\gamma_5$ is then compared with a suitable threshold $Th_G$. If $\gamma_5$ exceeds the threshold $Th_G$, the step selects rake receiver processing. An example of a cell geometry estimation technique that can be used is discussed later.

In addition to switching between the rake and equaliser, in the case that the equaliser 16 has been selected, the channel parameters estimated by the channel parameter estimation function 10 can be used to select the parameters $\theta_n$, $n=1, \ldots, N_E$ for the implementation of the equaliser 16.

Figure 5:
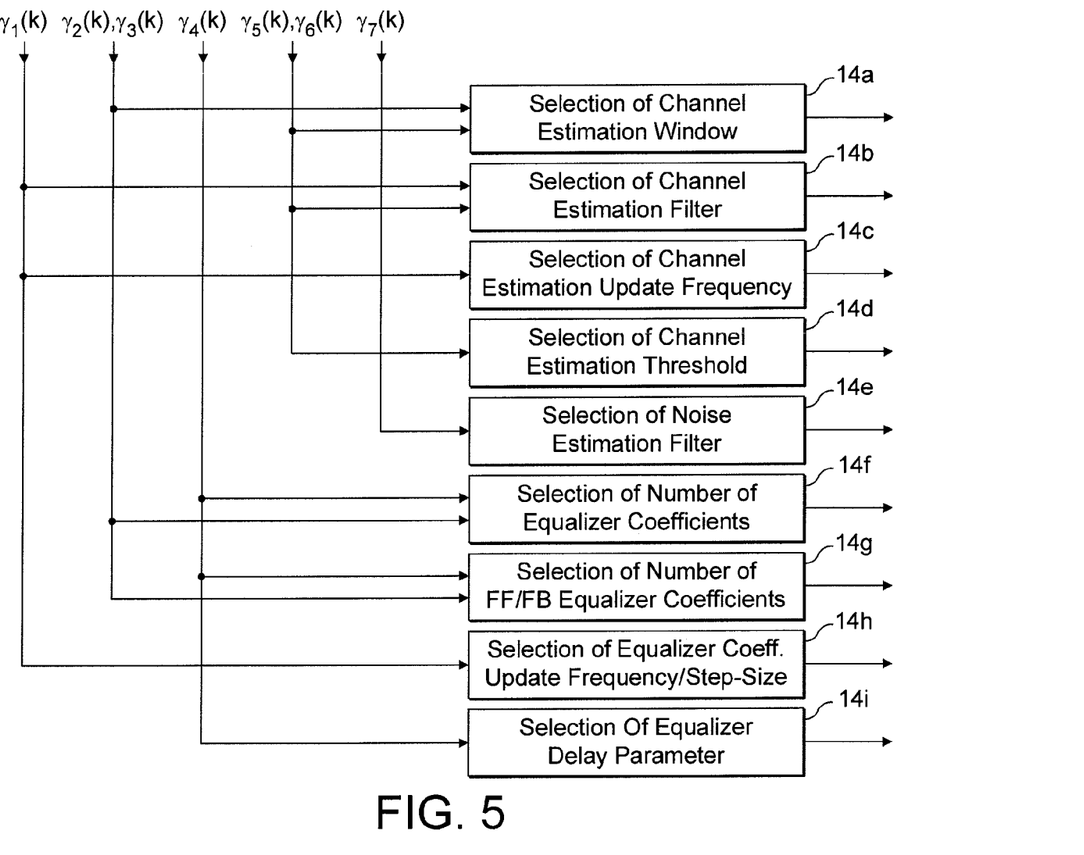
FIG. 5 is a schematic block diagram for the selection of a set of equaliser parameters.

FIG. 5 is a schematic block diagram for the selection of a set of equaliser parameters within the equaliser parameter selection function 14.

The time window W for estimation of the channel impulse response in the equaliser can be selected on the basis of an estimate of the channel out-of-window energy $\gamma_2$ and/or of the channel length or channel delay distribution (delay spread) $\gamma_3$ (block 14a of FIG. 5). This selection could additionally be based on an estimate $\gamma_5$ of the input signal-to-disturbance ratio or the cell geometry, and/or an estimate $\gamma_6$ of the signal-to-disturbance ratio of the estimated channel response.

The memory of an appropriate filter for estimation of the channel impulse response (block 14b of FIG. 5) and the frequency of update of the estimated channel impulse response (block 14c of FIG. 5) can be selected on the basis of an estimate of the degree of channel non-stationarity or temporal selectivity, for example through an estimate of the channel Doppler spread $\gamma_1$. The selection of the channel estimation filter could also be based on an estimate $\gamma_5$ of the input signal-to-disturbance ratio or the cell geometry, and/or on an estimate $\gamma_6$ of the signal-to-disturbance ratio of the estimated channel response.

At intermediate to low signal to noise-plus-interference ratios, the total channel estimation error can be reduced by setting to zero the estimated channel coefficients with amplitude lower than a suitable threshold. The value of this threshold can be selected based on an estimate $\gamma_5$ of the input signal-to-disturbance ratio or the cell geometry, and/or on an estimate $\gamma_6$ of the signal-to-disturbance ratio for the estimated channel coefficients (block 14d of FIG. 5).

The memory of appropriate filters for estimation of the input noise variance $\sigma^2$, for example in the case of MMSE equalisation, can be made adaptive in the presence on non-stationary input noise by measuring the degree on non-stationarity $\gamma_7$ (for instance, the time interval over which the noise is approximately constant) (block 14c of FIG. 5). On a completely different basis, the filtering may depend on the periodicity with which it is convenient to collect observations on the input noise—this in turn may be motivated simply by the need to reduce the implementation complexity in specific operating conditions or under critical processing requirements.

The number of equaliser coefficients (i.e., the equaliser time span) can be selected for example on the basis of an estimate of the channel out-of-window energy $\gamma_2$ and/or of the channel length or channel delay distribution (delay spread) $\gamma_3$, and on the position of the channel zeros in the z-plane $\gamma_4$ (block 14f of FIG. 5).

The number of feedforward and feedback equaliser coefficients in the case of decision feedback equalisation can similarly be based on estimates of the channel out-of-window energy $\gamma_2$ and/or of the channel length or channel delay distribution (delay spread) $\gamma_3$, and on the position of the channel zeros in the z-plane $\gamma_4$ (block 14g of FIG. 5).

The frequency of update of the equaliser coefficients in the case of block equalisation, or the coefficient step size in the case of adaptive equalisation, can be selected on the basis of an estimate of the degree of channel non-stationarity or temporal selectivity, e.g. through an estimate of a channel Doppler spread $\gamma_1$ (block 14h of FIG. 5).

The equaliser delay can be selected on the basis of an estimate of the channel phase characteristics derived from location of the channel zeros in the z-plane $\gamma_4$ (block 14i of FIG. 5).

Figure 6:
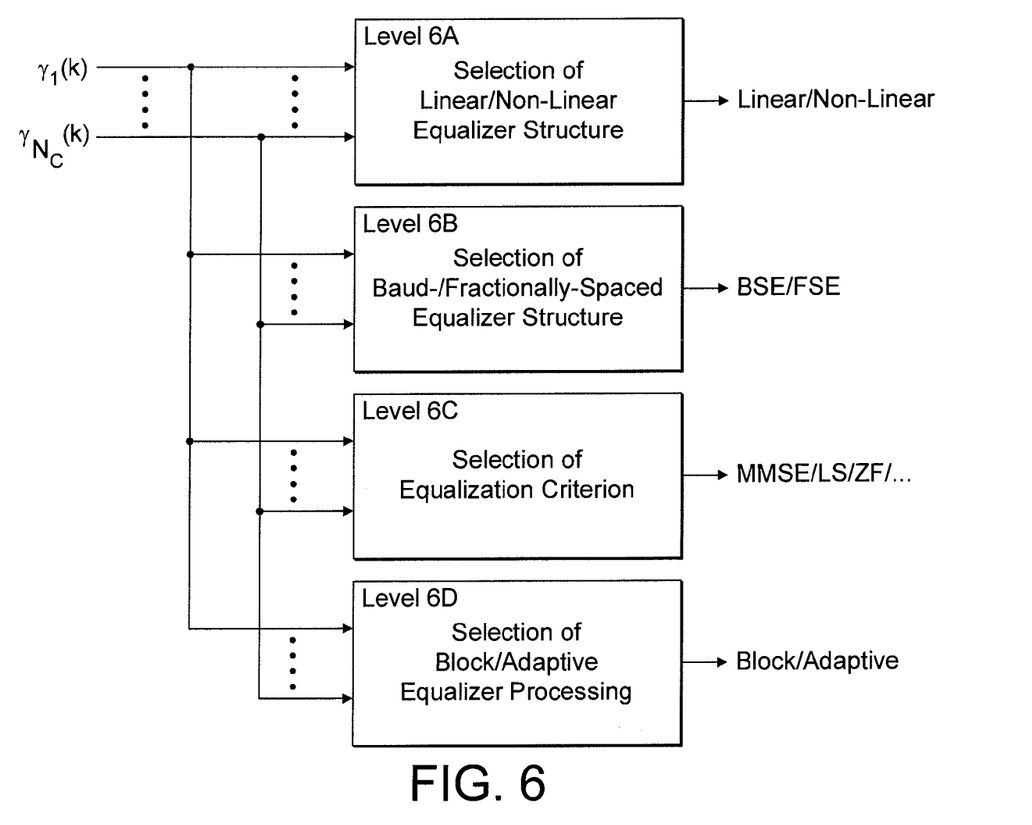
FIG. 6 is a schematic block diagram for the selection of the equaliser algorithm.

Reference will now be made to FIG. 6 which is a schematic block diagram illustrating the selection of a particular equalisation algorithm based on the estimated channel conditions. While the sequence described below represents one useful embodiment of the invention, it will be appreciated that any other sequence can be utilised to implement the selection of the appropriate equaliser algorithm.

Level 6a in FIG. 6 denotes the selection of a linear or non-linear equaliser structure. A criterion for making the choice between a linear or non-linear equaliser can be based for example on the location of channel zeros in the z-plane $\gamma_4$. In addition, this selection could depend on specific transmission conditions. For instance, in an HSDPA system, the use of a decision feedback equaliser may be limited to a condition where the user is allocated a significant percentage of the downlink power—which determines the portion of the downlink signal that can be used for decision feedback without requiring to make decisions on other user's data.

Level 6b in FIG. 6 denotes the selection of Baud-spaced or fractionally spaced equaliser structure. This selection is made based for instance on the location of the channel zeros in the z-plane $\gamma_4$, and should take into account the amount of excess transmission bandwidth (roll-off factor of transmit and receive filters).

It will be clear that either Baud-spaced or fractionally spaced design can be used with either of the linear or non-linear selections.

Level 6c in FIG. 6 denotes the selection of the equaliser cost function, specifically between the options of Minimum Mean-Square Error (MMSE) criterion, Least-Squares (LS) criterion, Zero-Forcing (ZF) criterion, or a criterion based on a different cost. Parameters that can be used to select between these criteria include an estimate of the signal-to-disturbance ratio or other parameters indicative of the statistical distribution of the disturbance. For instance, acceptable performance can be obtained for high signal-to-disturbance ratios using the ZF criterion. On the other hand, the use of a LS equaliser is preferable with respect to a MMSE equaliser in the presence of non-Gaussian disturbance.

Level 6d in FIG. 6 denotes the choice between equaliser block processing or the implementation of a tap adaptation rule. The selection between these two strategies may be made dependent on the degree of channel non-stationarity or temporal selectivity, e.g. through an estimate of a channel Doppler spread $\gamma_1$.

Block processing is mentioned for example in A. Klein, "Data Detection Algorithms Specially Designed for the Downlink of CDMA Mobile Radio Systems", in Proceedings of IEEE Vehicular Technology Conference, vol. 1, Phoenix, Ariz., May 1997, pp. 203-207. An adaptive algorithm is mentioned in K. Hooli, M. Latva-aho and M. Juntti, "Performance Evaluation of Adaptive Chip-Level Channel Equalizers in WCDMA Downlink", in proceedings of IEEE International Conference on Communications, vol. 6, Helsinki, Finland, June 2001, pp. 1974-1979.

One example of a cell geometry estimation technique which can be used in the above will now be described.

Figure 7:
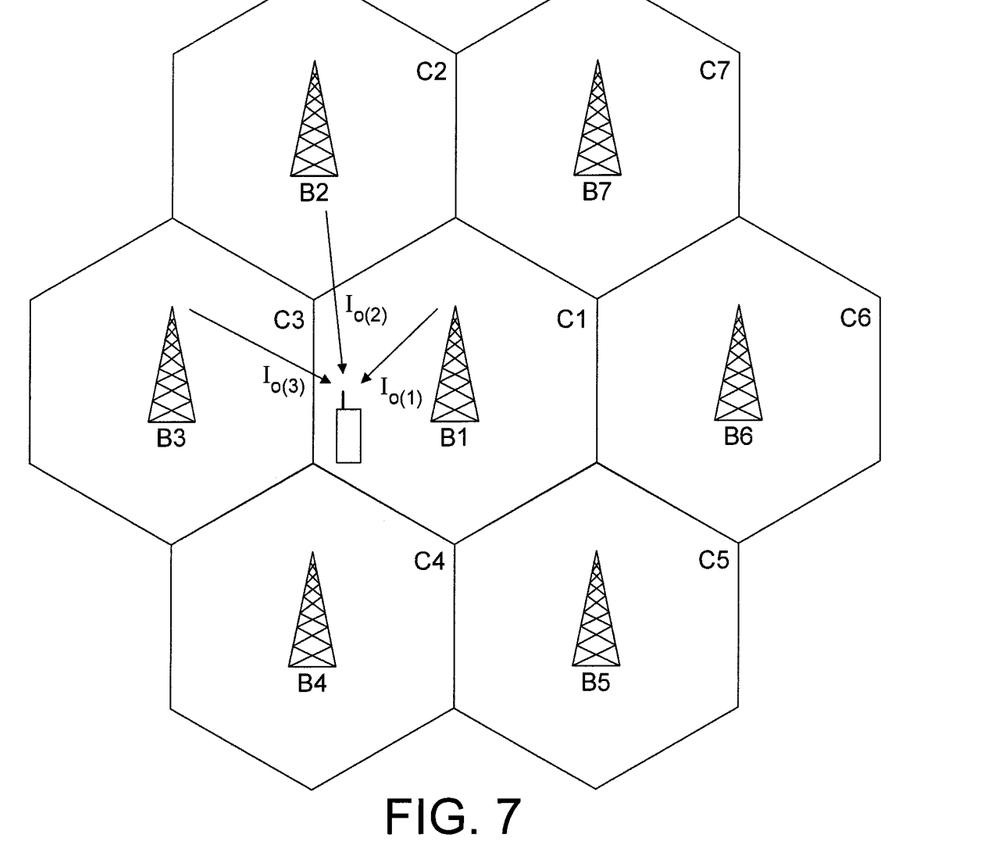
FIG. 7 is a schematic diagram of a wireless cellular network.

FIG. 7 is a schematic diagram of a wireless cellular network. A plurality of adjacent cells is illustrated, shown as being hexagonal but it will be readily appreciated that they could be of any shape. A base station B1 is shown serving cell C1 and potentially interfering with cells C2, C3, . . . , C7, served by base stations B2, B3, . . . , B7, respectively. It will readily be appreciated that there can be a large plurality of base stations and cells, and that base stations can serve any number of cells (including one).

A mobile terminal user equipment UE is shown in cell C1. As is mentioned above, the UE has a transmitter and a receiver for wireless signals. The main signal which the UE is intending to receive is labeled $I_{o(1)}$ to represent the downlink channels from the base station B1. In a WCDMA system, on a given cell, different physical channels are multiplexed in the code domain using separate spreading sequences (OVFS codes as described for example in the 3GPP specification "Technical Specification Group Radio Access Network; Spreading and Modulation (FDD)", TS 25.213, March 2006). In the case of orthogonal spreading code words, the original data symbols can then be effectively separated at the receiver by despreading. The composite signal transmitted from the base station B1 consists of the superposition of these physical channels further modified by multiplication by a pseudo-random scrambling code, which is unique (at least locally) to the cell. This composite signal is received at the user equipment UE after passing through a transmission channel which, if significant multipath components are present, results in a loss of orthogonality that produces multiple-access interference (MAI). The received signal is further corrupted by the addition of thermal noise and transmissions from other cells (for example $I_{o(2)}$ and $I_{o(3)}$). Due to lack of synchronisation and use of different scrambling codes, these interfering signals are not orthogonal to the wanted cell transmissions.

In the following, we denote by $I_{or}$ the total transmit downlink power of the wanted cell at the base station and define $\hat{I}_{or} = \sigma_d^2$ the received downlink power of the wanted cell at the UE, and $I_{oc} = \sigma_n^2$ the received power of the interfering cells plus thermal noise at the UE.

Each cell in the wideband CDMA system transmits a special constant power downlink channel known as the common pilot channel (CPIPH) on a fixed OVSF code (as discussed for example in the 3GPP specification "Technical Specification Group Radio Access Network; Physical Channels and Mapping of Transport Channels onto Physical Channels (FDD)", TS 25.211, December 2005). The CPICH is transmitted with a fixed, predetermined data pattern and can be used for channel estimation and signal-to-interference ratio (SIR) estimation.

Figure 8:
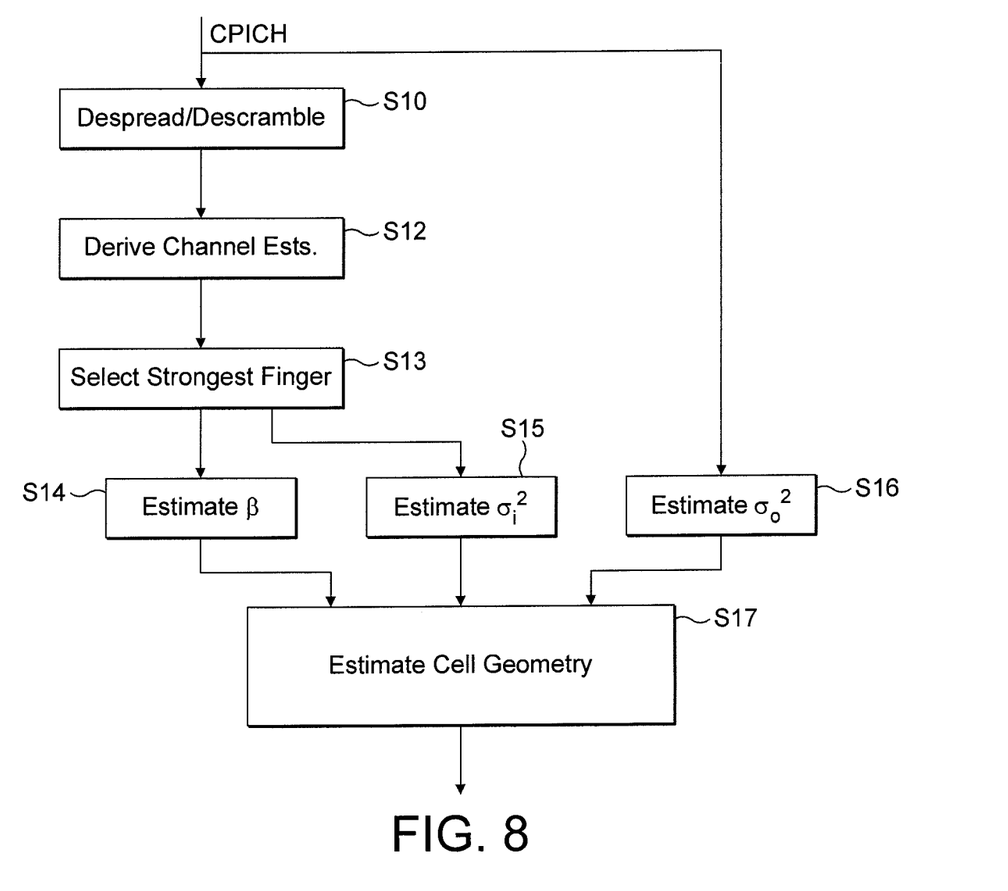
FIG. 8 is a schematic flow chart showing operation of a method of estimating cell geometry.

FIG. 8 is a schematic flow diagram showing the steps in a proposed geometry estimation algorithm.

At step S1, the received CPICH symbols are subject to despreading/descrambling. In a WCDMA receiver, there is a mechanism for rake finger tracking/management, whereby fingers are assigned to significant multipath components. For each multipath component or finger, since the CPICH data is known, a channel estimate $h_l$, $l=0, \ldots, L_0-1$, where $L_0$ is the total number of multipath channel coefficients, can be derived from the despread CPICH symbols as denoted in step S12.

In the following discussion, extensive use is made of the strongest of the rake fingers, that is the one corresponding to the channel delay of the estimated channel tap with the highest power, and this finger is selected at step S13. Nevertheless it will be appreciated that there are other possible implementations which can include the use of more or all the relevant channel delays or fingers, and even implementations that are based on the estimation of the channel coefficients without any connection with a rake receiver.

At step S14, the orthogonality factor $\beta$ is estimated. The orthogonality factor $\beta$ gives the relation between $\hat{I}_{or}$ and MAI. It is established in the following way:

Given a channel estimate $h_l$, $l=0, \ldots, L_0-1$, where $L_0$ is the total number of fingers, denoting by i the index of the strongest rake finger, we define the orthogonality factor $\beta_i$ as $$\beta_i = \frac{\sum_{l=0}^{L_0-1} |h_l|^2 - |h_i|^2}{\sum_{l=0}^{L_0-1} |h_l|^2}$$

i.e., as the ratio of the channel power that is perceived as interference by the strongest finger to the total channel power.

At step S15, an estimation of the noise-plus-interference after descrambling/despreading is made. Although denoted step S15, this could be done in parallel with or prior to step S14 and again is based on the selected finger or fingers in step S13. This is done in the following way.

The received symbols are corrupted by interference due to the non-orthogonal components of the received signal from the wanted cell after passing through the multipath channel, plus the received signals from the other cells together with thermal noise. If we restrict our attention to the interference received on the CPICH symbols despread on the strongest finger, this quantity is given by $$\sigma_i^2 = I_{oc} + \beta_i \hat{I}_{or}.$$

In order to estimate the level of this interference, we compute the variance of the noise power on the CPICH symbols of the strongest finger $$\sigma_i^2 = I_{oc} + \beta_i \hat{I}_{or} =$$

$$\text{Var}\{s_{i,k}\} = E\{|s_{i,k} - E\{s_{i,k}\}|^2\} \approx \frac{1}{N_s-1} \sum_{k=0}^{N_s-1} \left| s_{i,k} - \frac{1}{N_s} \sum_{k=0}^{N_s-1} s_{i,k} \right|^2,$$

where $s_{i,k}$ denotes the k-th despread CPICH symbol on the strongest finger.

According to the above equation, in step S15 the statistical mean and variance of the despread CPICH symbols are estimated by computing the sample mean and sample variance of the sequence $s_{i,k}$. However, the approach can be extended to the use of different mean and variance estimators.

Step S16 performs an estimation of the total input power. This is a straight-forward estimation of the quantity on the basis of the composite received chip sequence $\sigma_o^2 = \hat{I}_{or} + I_{oc}$, on the basis of the composite received chip sequence before despreading. This step can use the received signal samples that are employed for automatic gain control (AGC) computation.

Step S17 denotes the combination of the above parameters to estimate the quantities $I_{oc}$ and/or $\hat{I}_{or}/I_{oc}$ (or its inverse). This is an estimate of the cell geometry as required. The estimation of the intercell interference $I_{oc}$ is implemented as follows:

$$I_{oc} = \frac{\sigma_i^2 - \beta_i \cdot \sigma_o^2}{1 - \beta_i}.$$

From $I_{oc}$ and $\sigma_o^2 = \hat{I}_{or} + I_{oc}$ derived in step S6 we can also compute an estimate of $\hat{I}_{or}/I_{oc}$, for instance as $$\hat{I}_{or}/I_{oc} = \frac{\sigma_o^2 - \sigma_i^2}{\sigma_i^2 - \beta_i \sigma_o^2},$$

or, alternatively, an estimate of $I_{oc}/\hat{I}_{or}$ as $$I_{oc}/\hat{I}_{or} = \frac{\sigma_i^2 - \beta_i \sigma_o^2}{\sigma_o^2 - \sigma_i^2}.$$

Note that it may be desirable to filter the above quantities to obtain reliable estimates.

With regard to step S15, the choice of the averaging period for the computation of $E\{s,k\}$ can be made dependent on the speed with which the user equipment (mobile terminal) is moving. For low mobile speeds, that is for slowly time varying channels, the CPICH symbol estimate can be improved by using longer averaging periods. However, for high mobile speeds, corresponding to fast time varying propagation channels, if the averaging period is too long the CPICH symbol estimate will lag behind its actual value, thus degrading the geometry estimate.

It may not be desirable to perform the geometry estimation computations continuously, but instead to select intervals over which the computation should be performed. Preferably these intervals should be chosen to avoid times at which automatic gain control values are adjusted, and to avoid any bias in the geometry estimation caused by interference from any non-orthogonal intracell transmissions (such as synchronisation channels in the WCDMA network).

Figure 9:
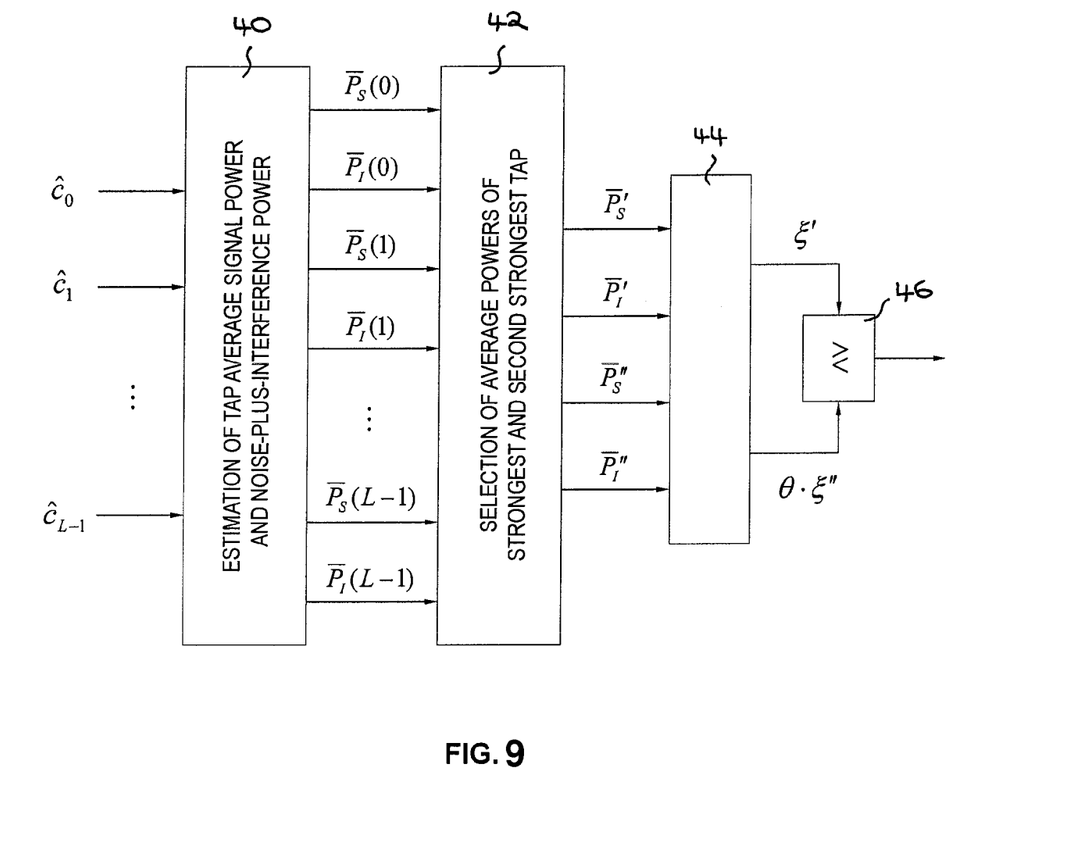
FIG. 9 is a schematic block diagram of a technique for single ray detection.

Reference will now be made to FIG. 9 to describe a single ray detection technique which is implemented in the selection of rake or equaliser function 12 and the estimation of channel parameters function 10.

Consider a wireless communication channel with overall time varying impulse response $h(t,\tau)=g_T(\tau) \otimes c(t,\tau) \otimes g_R(\tau)$, where '$\otimes$' denotes the convolution operator, $g_T(t)$ and $g_R(t)$ indicate the impulse response of the transmit and receive filters, and $$c(t, \tau) = \sum_{l=0}^{L-1} c_l(t)\delta(\tau - \tau_l)$$

represents the impulse response at time t of the propagation channel, modeled as a tapped delay line with delay index $\tau$. n terms of the various channel propagation paths, $c(t,\tau)$ is the sum of the complex gains of all the paths with delay $\tau$, measured at the current location of the receiver antenna.

Denote by $\hat{c}_l$, $l=0, \ldots, L-1$ the channel taps estimated at the receiver. In the case of a rake receiver, the estimated taps $\hat{c}_l$ may correspond to the tracked (and possibly combined) rake receiver fingers.

The single ray detection technique described herein is based on the use of long term averages of the signal power and noise-plus interference power corresponding to each estimated channel tap, according to the following procedure:

Estimate the signal power $P_S(l)$ and the noise-plus-interference power $P_I(l)$ for each of the channel taps $\hat{c}_l$, $l=0, \ldots, L-1$.

Filter the quantities $P_S(l)$ and $P_I(l)$ enough to average over the fast channel variations due to fading, to obtain the filtered quantities $\overline{P}(l)$ and $\overline{P}_I(l)$ for each of the channel taps $\hat{c}_l$, $l=0, \ldots, L-1$. In FIG. 3, the estimating and filtering steps are carried out in block 40. In one embodiment, the memory of the filter is in the order of a few hundreds of radio frames (where one WCDMA/HSPA radio frame has duration of 10 ms).

Find the strongest and the second strongest channel taps (fingers) based on the ratio between $\overline{P}_S(l)$ and $\overline{P}_I(l)$ for all channel taps $\hat{c}_l$, $l=0, \ldots, L-1$ (or based on the value of $\overline{P}_S(l)$ for all channel taps $\hat{c}_l$, $l=0, \ldots, L-1$). Let $\overline{P}_S'$ and $\overline{P}_I'$ denote the filtered signal power and noise-plus-interference power for the strongest tap, and $\overline{P}_S''$, and $\overline{P}_I''$ the filtered signal power and noise-plus-interference power for the second strongest tap. This step is shown in block 42.

Generate in block 44 generates comparison parameters $\xi'$, $\xi''$ based on the above power values $\overline{P}_S'$, $\overline{P}_I'$, $\overline{P}_S''$, and $\overline{P}_I''$. This can be carried out in a number of different ways.

In a first embodiment of the present invention:
Compute the quantities $\xi'=\overline{P}_S'/\overline{P}_I'$ and $\xi''=\overline{P}_S''/\overline{P}_I''$.

In a second embodiment of the invention:
Filter the quantities $\overline{P}_S'/\overline{P}_I'$ and $\overline{P}_S''/\overline{P}_I''$, and denote by $\xi'$ and $\xi''$ the respective filtered power ratios.

In a third embodiment of the invention:
Filter the quantities $\overline{P}_S' \cdot \overline{P}_I''$ and $\overline{P}_S'' \cdot \overline{P}_I'$, and denote by $\xi'$ and $\xi''$ the respective filtered quantities.

Finally, the comparison block 46 generates an object which controls the selection of rate receiver or equaliser. If $\xi' > \theta \cdot \xi''$ (or equivalently if $\xi'/\xi'' > \theta$), the receiver is determined to be operating under single-ray propagation conditions, i.e., that the channel propagation profile includes a single tap; otherwise, it is determined that the channel profile includes more than a single tap.

For each of the above embodiments, the threshold $\theta$ is optimized from simulation of the quantities $\xi'$ and $\xi''$ for the cases of single-ray and non single-ray propagation profiles.

The optimization of $\theta$ could also be based on the performance of the receiver processing algorithms to which the single-ray detection is applied. In this case, it is more appropriate to talk of effective single-ray conditions, defined as the conditions for which the receiver processing algorithm designed for single-ray channel (for example, rake processing in the case of a WCDMA/HSDPA receiver) outperforms the algorithm designed for non-single ray channel (for example, equaliser processing in the case of a WCDMA/HSDPA receiver).

In an alternative implementation, the signal and noise-plus interference power of the second strongest tap may be replaced by the combined power derived from all the remaining measured channel taps $\hat{c}_l$ other than the strongest channel tap.

The proposed approach can be further generalized to detect other channel conditions. For example, the proposed procedure can be straightforwardly modified for the detection of n rays channel condition by computing the quantities $\overline{P}_S'$ and $\overline{P}_I''$ as the filtered combined signal power and noise-plus-interference power of the n strongest taps, with $\overline{P}_S''$ and $\overline{P}_I''$ corresponding to the filtered combined signal power and sum noise-plus-interference power of the remaining channel taps.

For example, this strategy can be employed as an alternative to the measure of the energy outside a given temporal window, to estimate the length of the channel impulse response.

The above described embodiments allow identification of single-ray channel conditions based on the comparison between the estimated signal and noise-plus-interference power of the strongest channel tap and the second strongest channel tap (or of the strongest channel tap and all other channel taps).

The above described embodiments allow discrimination with respect to very short delay spread channels by relying to long term averages—by using filters with long enough memory to average over the channel variations due to fast fading.

The rake/equaliser selection is made based on the long term channel statistics, instead of the instantaneous channel taps. In fact, if a channel coefficient is present although temporarily attenuated, its power may increase rapidly enough to make it difficult for the selection process to react in time to switch to the appropriate receiver algorithm. By relying on the long term statistics, in the presence of multipath it is implicitly chosen to have in place a receiver algorithm capable of coping with a multipath channel. The instantaneous realisations of the channel do not always reflect the long term statistics, therefore any decision criterion needs to be based on an average of the channel realisation over a sufficiently long window of time.

In the above embodiment, the filter memory is referred to the 10 ms WCDMA radio frame. However, another relationship which is important is with the channel coherence time (which is defined as the time interval after which the channel realisations become uncorrelated):

$$T_c = \frac{1}{2 f_D},$$

where $f_D = f_0 v/c$ is the maximum Doppler frequency.

For instance, at a carrier frequency $f_0$ of 2 GHz and a mobile speed v of 3 km/h, a few hundred frames corresponds to a few tens of times the channel coherence time. In preferred embodiments, the filter memory is in the order of or greater than 10 times the channel coherence time and/or at least an order of magnitude greater than the frame.

The method described above for the identification of single-ray propagation conditions allows to select the appropriate receiver signal processing for the specific conditions of non-frequency selective channel, corresponding to a propagation profile containing a single tap. More specifically, it allows the possibility of switching between a receiver signal processing implementation designed to counteract the effect of multipath distortion, based, e.g., on a chip level equaliser for WCDMA/HSDPA, and a receiver signal processing implementation optimized for flat fading channel conditions, based, e.g., on a rake receiver for WCDMA/HSDPA.

For a WCDMA/HSDPA receiver, the selection of rake receiver processing in the presence of single-ray propagation has the following advantages:

- Provides the possibility of reducing the receiver complexity and power consumption, especially in the case of a software receiver implementation.
- Provides the possibility of achieving the best receiver performance under both frequency selective and flat channel conditions, in the presence of a limitation of the equaliser performance due to channel estimation errors.

What is claimed is:

1. A method of processing radio signals in a wireless radio receiver to identify an n-ray channel condition comprising:
   receiving signal samples and estimating a plurality of channel taps from the samples based on a tapped delay line model of the channel impulse response;
   estimating for each of the channel taps a signal power and a disturbance power;
   filtering the estimated signal power to provide a filtered signal power quantity;
   filtering the estimated disturbance power to provide a filtered disturbance power quantity;
   using the filtered power quantities to determine n strongest channel taps;
   generating first and second comparison parameters using the strongest channel taps and at least one other channel tap;
   providing a comparison result based on the first and second comparison parameters and a threshold value, and;
   identifying an n-ray channel condition from the comparison result.

2. The method according to claim 1, wherein n=1 and the step of identifying an n-ray channel condition comprises identifying a single ray channel condition.

3. The method according to claim 1, wherein the step of identifying an n-ray channel condition is used to select one of a rake processing and equalisation processing.

4. The method according to claim 1, wherein the step of generating the first comparison parameter comprises determining the ratio of the filtered signal power quantity and the filtered disturbance power quantity for the n strongest channel taps, and the second comparison parameter, the ratio of the filtered signal power quantity and the filter disturbance power quantity for the at least one other channel tap.

5. The method according to claim 4, wherein the ratios are filtered to generate the respective first and second comparison parameters.

6. The method according to claim 1, wherein the step of generating the first and second comparison parameters comprises filtering a multiplicand of the filtered signal power quantity for the strongest channel tap and the filtered disturbance power quantity for the at least one other channel tap as the first comparison parameter, and filtering a multiplicand of the filtered signal power quantity for the at least one other channel tap and the filter disturbance power quantity for the strongest channel tap.

7. The method according to claim 1, wherein the at least one other channel tap is the second strongest channel tap.

8. The method according to claim 1, wherein the at least one other channel tap comprises all channel taps apart from the n strongest taps.

9. A radio receiver for a wireless communication system comprising:
   means for receiving signal samples and estimating a plurality of channel taps from the samples based on a tapped delay line model of the channel impulse response;
   means for estimating for each of the channel taps a signal power and a disturbance power;
   means for filtering the estimated signal power to provide a filtered signal power quantity;
   means for filtering the estimated disturbance power to provide a filter disturbance power quantity;
   means for using the filtered power quantities to determine n strongest channel taps;
   means for generating first and second comparison parameters using the n strongest channel taps and at least one other channel tap;
   means for providing a comparison result based on the first and second comparison parameters and a threshold value; and
   means for identifying an n-ray channel condition from the comparison result.

10. The receiver according to claim 9, which comprises a rake processing function and an equalisation processing function and additionally comprises means for selecting one of the rake processing function and equalisation processing function based on the output from the identifying means.

11. A computer program product comprising program code stored on a non-transitory computer readable medium which when executed by a processor implements a method according to claim 1.

12. A radio receiver for a wireless communication system comprising:
   a wireless interface for receiving digital samples;
   a processor arranged to execute a program which implements the steps of claim 1;
   a memory holding a rake processing code sequence and an equalisation processing code sequence; the processor adapted to execute one of the rake processing and equalisation processing sequence in dependence on the identified n-ray channel condition.

* * * * *